UNITED STATES PATENT OFFICE 3,577,314
Patented May 4, 1971

3,577,314
LAMINATED FUEL CELL CONTAINER
Theodore A. Evans, Akron, Ohio, asignor to The Goodyear Tire & Rubber Company, Akron, Ohio
No Drawing. Filed Mar. 24, 1969, Ser. No. 810,019
Int. Cl. B65g 3/00
U.S. Cl. 161—189    5 Claims

ABSTRACT OF THE DISCLOSURE

This invention relates to a method of preparing a container by forming a laminate comprising a polyamide fabric having a coating of a fluorocarbon composition thereon and having a polyamide film adhered to the fluorocarbon coating, the fluorocarbon composition being cured with an organic peroxy compound, an organic amine or a Schiff's base when compounded with metal oxides and iron oxide.

---

This invention relates to a fuel container having improved resistance to high and low temperatures. More particularly, this invention relates to a fuel container having a barrier that exhibits improved resistance to the diffusion of fuels at relatively high and low temperatures and exhibits appreciable resistance to flex cracking at relatively low and high temperatures.

Although polyurethane coated nylon fabric flexible fuel cells or tanks are used currently in airplanes, they are inadequate in some respects for use in supersonic aircraft such as the F–111 or the proposed SST, because the materials of construction used in making these fuel cells are approaching their operational limits as the temperature exceeds about 250° F. Furthermore, these materials are lacking in diffusion resistance as the fuel temperature approaches about 165° F.

Therefore, it is an object of this invention to provide an improved fuel cell having improved high and low temperature properties which also exhibits satisfactory fuel diffusion resistance at relatively high temperature.

The objects of this invention can be achieved by compounding elastomeric fluorocarbons with suitable compounding agents as hereinafter described, applying the compounded fluorocarbons to a suitable polyamide type fabric, then shaping the fabric having the fluorocarbon coated thereon and during the shaping or prior thereto adhering to the fluorocarbon coated fabric a polyamide film, said film usually being about 1 to 20 and preferably less than 5 mils in thickness. The best results are obtained when the polyamide film is adhered to the outside of the container, and then the container is cured by a suitable method such as being held in a hot air circulating oven or by the well-known vacuum blanket vulcanization techniques.

The fluorocarbons useful in this invention are the highly halogenated chain polymers whose structure is composed substantially exclusively of carbon, hydrogen and halogen atoms and are reacted at elevated temperatures with an organic peroxy compound which is stable against decomposition below about 50° C., and with a basic metal compound, to produce a cross-linked polymer. It is preferred that the chain polymers be at least half fluorinated and that —$CH_2$— groups be present. In other words, at least some of the carbon atoms on the chain should be bonded only to hydrogen atoms and other carbon atoms.

Chain polymers with a minor degree of disorder in their molecules are generally more thermoplastic in nature than those without such disorder. Elasticity requires a greater degree of disorder. In order to obtain an elastomeric product, at least 10 percent of the carbon atoms in the structure must be of the type which are bonded only to hydrogen atoms and other carbon atoms. Ordinarily, a monoolefinic compound containing a $CH_2$= group is used to provide these carbon atoms, and this results in chains containing —$CH_2$— groups. Ordinarily, such mono-olefinic compound is copolymerized with another highly fluorinated mono-olefin to help give the polymer molecule its highly fluorinated nature.

Among the highly fluorinated mono-olefins which may be used as comonomers are: $CF_2$=CHCl, $CF_2$=$CCl_2$, $CF_3$—CF=$CF_2$, $CF_2$=CHCl, $CF_3$—CCl=CCl—$CF_3$, $CF_3$=CHF, $CF_3$—CH=CH—$CF_3$ (cis or trans), $$CF_2=CF_2$$

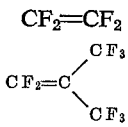

$CF_2$=CHBr, $CF_2$=CCl—$CF_3$, $CF_3$—CH=$CH_2$ and $CF_3$—CCl=$CCl_2$.

Among the hydrogen containing mono-olefins which may be used as comonomers with the above highly fluorinated mono-olefins are: $CF_2$=$CH_2$, CFH=$CH_2$, $CH_2$=$CH_2$, CHCl=$CH_2$, $CCl_2$=$CH_2$, CClH=$CH_2$
CHBr=$CH_2$ and

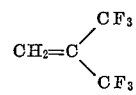

Of these, the most advantageous combinations are:

CF=CFCl/$CF_2$=$CH_2$, $CF_2$=$CF_2$/$CF_2$=$CH_2$, $CF_2$=$CF_2$=$CF_2$/$CH_2$=CFCl, and $CF_2$=CHBr/$CF_2$=$CH_2$ The aforementioned mono-olefins may be copolymerized in any proportions, depending on the characteristics desired. Good chemical stability requires fluorine substitution at at least one-half of the possible positions for such substitution in the polymer chain.

It is to be noted that all of the monomers enumerated above contain only carbon, hydrogen and halogen atoms and, therefore, produce copolymers substantially without markedly reactive functional groups. This, of course, does not preclude the presence of other atoms in end groups which might be formed by chain stoppers in the polymerization zone, present by design or by accident. Such end groups are relatively few in number and are difficult to detect. They do not, in any way, affect the characteristics of the polymer to any noticeable degree.

The films useful as barriers in this invention are made from the polyamides. The films are made by solution casting or other well-known techniques from the polyamides described hereinbefore, for example, those available under the trade name Kapton.

These aromatic polyamides useful in this invention are well known and are described in Modern Plastics Encyclopedia (1968–9) and are generally indicated by the formula:

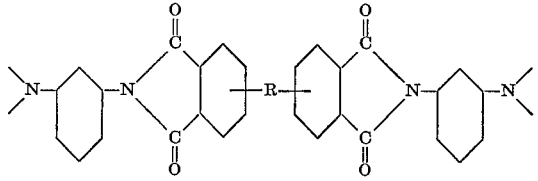

where R is alkylene, arylene or substitute arylene, preferably of 2 to 10 carbon atoms and usually of about 50,000 molecular weight, though those of 100,000 and higher can be used also.

These polyimides are sometimes considered to be a reaction product of an aromatic tetracarboxylic acid anhydride and an aromatic diamine. A specific polyimide representative of the class is the one prepared by reaction of benzophenone tetracarboxylic acid dianhydride and metaphenylene diamine. This reaction product is essentially high molecular weight linear polymers with a limited degree of crosslinking and a high glass transition temperature ($T_g$).

Specific examples illustrative of this invention are disclosed as follows with all parts and percentages being by weight unless otherwise indicated.

EXAMPLE I

A fluorocarbon elastomer, Viton B, 100 parts, was compounded according to the recipe of Table I as follows:

TABLE 1.—COMPOUNDED RECIPE

| Ingredients: | Parts |
|---|---|
| Viton B [1] | 100 |
| Magnesium oxide | 15 |
| N,N'-dicinnamylidene-1,6-hexane diamine | 2.0 |
| Red iron oxide | 7.0 |

[1] A commercial elastomeric terpolymer of vinylidene fluoride, hexafluoropropylene and tetrafluoroethylene.

The compounded fluorocarbon elastomer was dissolved in sufficient methyl ethyl ketone (MEK) to give a cement of 33 percent solids. This cement was used in a cement spreader to coat a square woven polyamide fabric where the polyamide was a copolymer of meta-phenylene diamine and isophthaloyl chloride. The fabric prior to being fed to the cement spreader was held for one hour at 300° F. to eliminate moisture and oils from the weaving and handling process. The coating on the fabric was built up about 3 mils per pass through the spreader and was dried 15 minutes in an air circulation chamber to remove the ketone. While the cement coating was still tacky a polyimide film (Kapton) was spread over the outside of the fabric containing the fluorocarbon coating and cured 60 minutes at 300° F. in a vacuum blanket with 85 p.s.i. back-up air pressure to laminate the film to the coated fabric. The cured fabric/film laminate was cut into patterns and the fuel cell or bag assembled on the building table by cementing the seams with the MEK cement used to coat the fabric. Kraft paper was used to separate and keep the fabric sheets forming the top and the bottom of the bag from adhering together while spread on the building table. The finished bag was cured using one of the following curing techniques: an autoclave, a vacuum bag, or a hot air oven. Improved performance was obtained with the cells cured with a vacuum bag or a hot air oven.

Also, the cells made with a fuel barrier of 1 to 2 mils of a polyimide film on the outside of the cell were superior to those where the barrier was on the inside of the cell or inner layer of a laminate. Also, the 1 and 2 mil thick barrier films were found to be better than a 5 mil one.

Thus, the above techniques of cell construction provide a fuel cell that withstands flexing at −65° F. and 450° F. and offers resistance to diffusion of the fuel at fuel temperatures of 165° F. The films of the polyimide polymer described above are particularly desirable as they permit the coating on the polyamide fiber to be thinner and thereby improve the flex cracking life of the resulting laminate as well as enhancing the fuel diffusion resistance at elevated fuel temperatures.

In addition to the fluorocarbon elastomers and polyimide films described in the example, the copolymers of the advantageous monomer combinations set forth heretofore are particularly desired for use in this invention to form elastomers to be cured with red iron oxide, an alkaline metal oxide and curatives which cure at a temperature of at least 150° F. or higher by activation of the curative.

Although for convenience of comparison the Schiff base N,N'-dicinnamylidene-1,6-hexanediamine was used in the working examples other Schiff bases, such as benzyl-aniline, the ketone reaction products of the aliphatic and aromatic diamines of about 1 to 20 carbon atoms, for instance, acetone, methyl ethyl ketone and hexylene diamine, phenylene diamine, ethylene diamine and related amines can be used, exceptional care must be exercised to keep the elastomer relatively cool during the compounding to prevent premature curing or scorching. Likewise, the solid amines present this problem so it is preferred to use the lower molecular weight liquid amines as curatives. For example, the liquid tetraethylene pentamines, the diethylene triamine, and ethylene diamine are the preferred amine curatives as they are readily mixed with solvent solutions or cements of the fluorocarbon elastomers without premature curing.

Suitable solvents for the curatives and the elastomers in the preparation of adhesives or cements are the liquid ketones, such as acetone, methyl ethyl ketone, methyl isobutyl ketone, tetrahydrofuran, dimethylformamide and lower esters, such as ethyl acetate.

EXAMPLE II

To compare the effect of various curing agents a commercial fluorocarbon elastomer, Viton B, was compounded according to the recipe shown in Table 2 and the sheets were cured for 60 minutes at 300° F. Tensile specimens were cut from the cured sheets and tensile and elongation at the break point were determined on these samples at −70, 77, and 450° F. and the results of these tests are recorded in Table 3.

TABLE 2.—ELASTOMER COMPOUNDED WITH PEROXIDE

| Recipe number | 91 | 93 | 106 | 107 |
|---|---|---|---|---|
| Viton B | 100 | 100 | 100 | 100 |
| Magnesium oxide [1] | 15 | 15 | 15 | 15 |
| Red iron oxide | 7 | 7 | 7 | 7 |
| N,N'-dicinnamylidene-1,6-hexanediamine | 2 | | | |
| Benzoyl peroxide | | | 4.2 | 3 |
| 2,4-dichlorobenzoyl peroxide | | 1.30 | | |
| Dicumyl Peroxide | | | 4 | |

[1] This magnesium oxide has a surface area of about 23 square millimeters per gram.

TABLE 3.—ORIGINAL PHYSICAL PROPERTIES OF CURED VITON B COMPOUNDS

| | Tensile, p.s.i. | | | Elongation and hardness | | |
|---|---|---|---|---|---|---|
| Recipe No. | −70° | 77° | 450° | −70° | 77 | 450° |
| 91 | 8,739 | 2,889 | 242 | 36 (83D) | 925 (60A) | 195 |
| 93 | 6,358 | 2,425 | 231 | 25 (84D) | 711 (58A) | 185 |
| 106 | 5,766 | 2,562 | 189 | 26 (88D) | 794 (57A) | 147 |
| 107 | 5,454 | 2,144 | 167 | 31 (87D) | 768 (56A) | 151 |

Instead of Viton B, Viton A the copolymer of vinylidene fluoride and hexafluoropropylene can be cured with the above recipes to give a satisfactory coating product or cement.

The elongation of the organic peroxide samples are inferior to those obtained with N,N'-dicinnamylidene-1,6-hexane-diamine curative.

The organic peroxides useful in this invention generally are hereinafter called polytertiary peroxide or peroxy compounds. The ditertiary peroxides can be represented by the general formula:

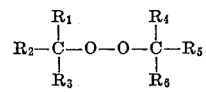

in which $R_1$, $R_2$, $R_3$, $R_4$, $R_5$ and $R_6$ are the same or different alkyl, cycloalkyl, cycloalkenyl, aryl, substituted aryl, aralkyl hydrocarbon radical. The alkyl radicals can be straight chain or branched, saturated or unsaturated. Usually these radicals contain less than about 18 to 20 carbon atoms and preferably contain less than about 7 or 8 carbon atoms.

If one or more of the above R groups contains an additional peroxy group attached to a tertiary carbon atom then it is possible to have di- and tri-peroxy compounds which are useful in this invention. These di-peroxy compounds are illustrated by the following formula:

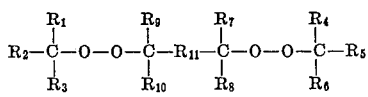

where $R_7$, $R_8$, $R_9$, $R_{10}$, and $R_{11}$ have the same meaning as that indicated for $R_1$ through $R_6$ in the above formula except $R_{11}$ is a divalent radical and the symbols of this formula which correspond to those of the first formula likewise have the same meaning as that indicated for the first formula.

Various polytertiary peroxides of the general formula shown above can be used in the practice of this invention. It is obvious that in selecting a peroxide for use in this invention the peroxide should be stable at the temperature of mixing of the elastomeric composition so that it can be mixed without decomposing and that the peroxide should decompose at a reasonable rate under the curing conditions used so that the resulting radicals can enter into the curing reactions. Representative examples of such peroxides are ditertiary-butyl peroxide; ditertiary-amyl peroxide; di-alpha, alpha-dimethylbenzyl) peroxide (also known as dicumyl peroxide); di(alpha-alpha-dimethyl-p-chlorobenzyl) peroxide; di-(alpha,alpha-dimethyl-2,4-dichlorobenzyl) peroxide; tertiarybutyl-1-methylcyclohexyl peroxide; and peroxides formed by the oxidation of terpene hydrocarbons such as turpentine, alpha-pinene, paramethane and pinane.

In addition to the above ditertiary peroxides, $R_{11}$ in the formula for the diperoxy compound may also contain unsaturation wherein at least one pair of carbon atoms are joined by a double or a triple bond. Representative peroxides of the second formula type are 2,2-di-(tertiarybutylperoxy) butane; 2,5 - ditertiary - butyl-peroxy-2,5-dimethylhexane; 2,5 - ditertiary amyl - peroxy-2,5-dimethylhexane; 2,5 - ditertiary-butyl-peroxy-2,5-dimethyl-3-hexene and 2,5-ditertiary-butyl-peroxy-2,5-dimethyl-3-hexyne. The preferred organic peroxides useful in this invention are dicumyl peroxide, available commercially as Di-Cup 400 and 2,5-ditertiary-butyl-peroxy-2,5-dimethylhexane, sometimes referred to herein as DBPH, available commercially as Varox.

Some of the acetylenic polyperoxy compounds desirable for curing these fluorocarbon compositions are 2,5-dimethyl-2,5-di(peroxy ethyl carbamate) hexyne-3; 2,5-dimethyl-2,5-di(t-butyl-peroxy) hexyne-3; 3,6-dimethyl-3,6-di(t-butyl peroxy) octyne-4; 1,4-tetraphenyl-1,4-(t-butylperoxy) butyne-2.

The quantity of polytertiary peroxide used in general is at least about 0.5 percent by weight, based on the polymer with the preferred amount being about 1.0 to 4.0 percent. Normally, the use of more than about 6 percent of the polytertiary peroxides results in the cured polymer having physical properties that are poorer than the optimum values obtainable at lower peroxide levels. Hence, use of amounts in excess of about 6 percent, say for instance, more than 10 percent would not generally be desirable.

However, it should be appreciated that when reinforcing fillers, such as the carbon blacks or silicas, are used, that the percent polytertiary peroxide used preferably will be higher than when no filler is present, i.e., when curing the so-called gum stocks. The amount of additional polytertiary peroxide used and required when fillers are present is to a certain extent a function of the amount of filler used. Hence, in some cases the amount of extra peroxide used will be about 1.5 to 3 times that required to cure the gum stock per se.

Although the polyimides such as Kapton, or the pyromellitic dianhydride-phenylene diamine types became available relatively recently in film forms, other polyimide films can also be used in place of Kapton, for instance, in this invention. For example, the polyimide films prepared from the diamines and dianhydrides of Table II of C. E. Sroog, Journal of Polymer Science, Part C., No. 16, pp. 1191–1209 (1967) are representative of the many kinds of polyimides that can be prepared and used in the practice of this invention, with the preferred films being those that do not melt at temperatures below about 250° C. and those melting above 300° C. being preferred in the high temperature range. Also, it should be emphasized that polyimide films such as Kapton F are available with a Teflon FEP, fluorocarbon film or coating, on either one or both sides of the Kapton film, and these are utilizable in place of a straight polyimide film such as Kapton H.

It should be appreciated that the polyimides illustrated by the foregoing formula are aromatic in nature and that aliphatic polyimides, such as those described in the Sroog article, supra, or Sroog's article in the Journal of Polymer Science, Part A., vol. 3, pp. 1373 to 1390 (1965) and the Irwin et al. article in the Journal of Polymer Science, Part C., No. 19, pp. 41–48 (1967) can be used, also. For instance, the polyimide films of pyromellitic dianhydride and phenylene diamine, diamino diphenyl propane and benzidine can also be used in the manner illustrated above with Kapton.

While certain representative embodiments and details have been shown for the purpose of illustrating the invention, it will be apparent to those skilled in this art that various changes and modifications may be made therein without departing from the spirit or scope of the invention.

What is claimed is:
1. A container having a body portion formed of polyamide fabric having a coating of a fluorocarbon composition thereon, said polyamide having adhered thereto a polyimide film.
2. The container of claim 1 wherein the film is 1 to 16 mils thick.
3. The container of claim 1 wherein the film is adhered to the coating on the outside of the fabric by a fluorocarbon cement.
4. The container of claim 1 wherein each seam between the edges of the fabric are adhered together with a solvent solution of a fluorocarbon composition, said fluorocarbon composition of the coating and the solvent solution cmprising a chain-saturated polymer containing fluorine substitution of at least half the positions available for substitution and composed substantially exclusively of carbon, hydrogen and halogen atoms, 1 to 25 parts of a basic metal oxide per 100 parts of polymer, 1 to 50 parts of red iron oxide per 100 parts of polymer, and a curative selected from the class consisting of
(1) an organic peroxy compound and
(2) an organic amine.
5. The container of claim 4 wherein the organic amine is a Schiff's base.

References Cited

UNITED STATES PATENTS

| | | | |
|---|---|---|---|
| 2,973,293 | 2/1961 | Schofield | 161—98 |
| 2,405,986 | 8/1946 | Sullivan | 161—227X |
| 2,440,965 | 5/1948 | Merrill et al. | 161—227 |
| 2,687,977 | 8/1954 | Gerke | 161—227X |
| 2,754,992 | 7/1956 | Wilson | 244—135X |
| 2,816,055 | 12/1957 | Semegen et al. | 161—227 |
| 3,389,749 | 6/1968 | Towns et al. | 161—189X |
| 3,502,498 | 3/1970 | Petriello et al. | 161—189X |

FOREIGN PATENTS 1,039,967   8/1966   Great Britain.

HAROLD ANSHER, Primary Examiner

U.S. Cl. X.R.

161—227; 220—83; 244—135; 280—5

PO-1050
(5/69)

UNITED STATES PATENT OFFICE
CERTIFICATE OF CORRECTION

Patent No. 3,577,314      Dated May 4, 1971

Inventor(s) Theodore A. Evans

It is certified that error appears in the above-identified patent and that said Letters Patent are hereby corrected as shown below:

Column 1, line 14 in the Abstract, change "polyamide" to -- polyimide --;
    line 47, change "polyamide" to -- polyimide --;
    line 50, change "polyamide" to -- polyimide --;

Column 2, line 21, add a comma -- , -- at the end of the line, after "CH$_2$";
Column 2, the formula at lines 23-27, change "CF$_3$" to -- CH$_3$ -- so that the formula reads --

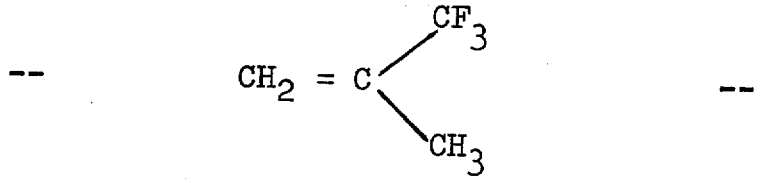

Column 2, line 30, change the first "CF" to -- CF$_2$ --;
    line 31, delete the second "CF$_2$=" so that the line reads -- CF$_2$=CF$_2$, CH$_2$=CFCl, --
    line 51, change "polyamides" to -- polyimides --;
    line 52, change "polyamides" to -- polyimides --;
    line 55, change "polyamides" to -- polyimides --; and Column 4, line 44, change "77" (second occurrence) to -- 77° --.

Signed and sealed this 29th day of February 1972.

(SEAL)
Attest:

EDWARD M. FLETCHER, JR.      ROBERT GOTTSCHALK
Attesting Officer      Commissioner of Patents